(12) United States Patent
Powell et al.

(10) Patent No.: US 10,085,224 B2
(45) Date of Patent: Sep. 25, 2018

(54) METHODS AND APPARATUS FOR SYNCHRONIZATION OF MEDIA PLAYBACK WITHIN A WIRELESS NETWORK

(71) Applicant: Apple, Inc., Cupertino, CA (US)

(72) Inventors: Richard Powell, Cupertino, CA (US); Daniel Naito, Cupertino, CA (US); James Hollabaugh, Cupertino, CA (US); Daniel Klingler, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 68 days.

(21) Appl. No.: 14/548,032

(22) Filed: Nov. 19, 2014

(65) Prior Publication Data
US 2016/0142988 A1    May 19, 2016

(51) Int. Cl.
*H04W 56/00*   (2009.01)
*H04W 84/12*   (2009.01)

(52) U.S. Cl.
CPC ......... *H04W 56/00* (2013.01); *H04R 2420/07* (2013.01); *H04W 84/12* (2013.01)

(58) Field of Classification Search
CPC .. H04W 56/0035; H04W 56/00; H04W 84/12
USPC ........... 345/473; 370/350; 375/354; 455/502
See application file for complete search history.

(56) References Cited

U.S. PATENT DOCUMENTS

| 3,177,292 A | 4/1965 | Ewin |
| 3,755,628 A | 8/1973 | Hughes et al. |
| 4,083,005 A | 4/1978 | Looschen |
| 4,087,643 A | 5/1978 | Joslow et al. |
| 4,099,028 A | 7/1978 | Towson, V |
| 4,216,426 A | 8/1980 | Flora |
| 4,280,221 A | 7/1981 | Chun et al. |
| 4,500,989 A | 2/1985 | Dahod |
| 4,527,266 A | 7/1985 | Bogan et al. |
| 4,543,654 A | 9/1985 | Jones |

(Continued)

FOREIGN PATENT DOCUMENTS

| EP | 0691617 A2 | 1/1996 |
| EP | 1427121 A1 | 6/2004 |

(Continued)

OTHER PUBLICATIONS

IEEE Draft Standard P802.11v /D6.01.

(Continued)

*Primary Examiner* — Natasha W Cosme
(74) *Attorney, Agent, or Firm* — Gazdzinski & Associates, PC

(57) ABSTRACT

Methods and apparatus for synchronization of media playback within a wireless network. In one embodiment, the present disclosure is directed to precision synchronization over time, based on repeated measurements of a common time reference. In one exemplary embodiment, the common time reference is a Time Synchronization Function (TSF) of a Wireless Local Area Network (WLAN). In another exemplary embodiment of the present disclosure, the application processor and the modem processor measure a pulse width and the aforementioned common time reference in order to adjust media playback.

20 Claims, 10 Drawing Sheets

(56) References Cited

U.S. PATENT DOCUMENTS

| | | |
|---|---|---|
| 4,550,400 A | 10/1985 | Henderson, Jr. et al. |
| 4,554,658 A | 11/1985 | Marten et al. |
| 4,561,118 A | 12/1985 | Thinschmidt et al. |
| 4,701,904 A | 10/1987 | Darcie |
| 4,730,268 A | 3/1988 | Marin |
| 4,745,597 A | 5/1988 | Morgan et al. |
| 4,773,065 A | 9/1988 | Kobayashi et al. |
| 4,785,396 A | 11/1988 | Murphy et al. |
| 4,797,877 A | 1/1989 | Pope et al. |
| 4,860,309 A | 8/1989 | Costello |
| 5,160,929 A | 11/1992 | Costello |
| 5,210,846 A | 5/1993 | Lee et al. |
| 5,237,322 A | 8/1993 | Heberle |
| 5,357,511 A | 10/1994 | Dinapoli et al. |
| 5,448,311 A | 9/1995 | White et al. |
| 5,469,431 A | 11/1995 | Wendorf et al. |
| 5,487,066 A | 1/1996 | McNamara et al. |
| 5,621,735 A | 4/1997 | Rochester, Jr. et al. |
| 5,640,399 A | 6/1997 | Rostoker et al. |
| 5,661,583 A | 8/1997 | Nhu |
| 5,754,764 A | 5/1998 | Davis et al. |
| 6,061,604 A | 5/2000 | Russ et al. |
| 6,272,130 B1 | 8/2001 | Panahi et al. |
| 6,393,020 B1 | 5/2002 | Patton |
| 6,425,009 B1 | 7/2002 | Parrish et al. |
| 6,532,274 B1 | 3/2003 | Ruffini |
| 6,542,754 B1 | 4/2003 | Sayers et al. |
| 6,608,571 B1 | 8/2003 | Delvaux |
| 6,766,381 B1 | 7/2004 | Barker et al. |
| 6,965,299 B1 | 11/2005 | Dally et al. |
| 7,295,578 B1 | 11/2007 | Lyle et al. |
| 7,643,595 B2 | 1/2010 | Aweya et al. |
| 7,792,158 B1* | 9/2010 | Cho ............... H04J 3/0664 370/350 |
| 8,095,175 B2 | 1/2012 | Todd et al. |
| 8,149,880 B1 | 4/2012 | Cho et al. |
| 8,521,101 B1 | 8/2013 | Kadam et al. |
| 2001/0004366 A1 | 6/2001 | Matsumura et al. |
| 2002/0012401 A1 | 1/2002 | Karolys et al. |
| 2002/0154647 A1 | 10/2002 | Potash |
| 2003/0078006 A1 | 4/2003 | Mahany et al. |
| 2003/0115369 A1 | 6/2003 | Walter et al. |
| 2004/0001007 A1 | 1/2004 | Inoue et al. |
| 2004/0022210 A1 | 2/2004 | Frank et al. |
| 2004/0208200 A1 | 10/2004 | Hejdeman et al. |
| 2004/0240404 A1 | 12/2004 | Ibrahim et al. |
| 2005/0057307 A1 | 3/2005 | Zhang et al. |
| 2005/0069318 A1 | 3/2005 | Lee et al. |
| 2005/0088443 A1* | 4/2005 | Blanco ............... G06T 13/00 345/473 |
| 2005/0141565 A1 | 6/2005 | Forest et al. |
| 2006/0187969 A1 | 8/2006 | Kadowaki |
| 2007/0211686 A1 | 9/2007 | Belcea et al. |
| 2007/0291777 A1 | 12/2007 | Jamieson et al. |
| 2008/0240021 A1 | 10/2008 | Guo et al. |
| 2008/0287153 A1* | 11/2008 | Fullam ............... H04H 20/67 455/502 |
| 2008/0315934 A1 | 12/2008 | Engl |
| 2009/0077277 A1 | 3/2009 | Vidal et al. |
| 2009/0161655 A1 | 6/2009 | Uppala |
| 2010/0254345 A1 | 10/2010 | Raravi et al. |
| 2011/0191512 A1 | 8/2011 | Beccue |
| 2011/0216816 A1 | 9/2011 | Frenzel |
| 2011/0228888 A1* | 9/2011 | Gelter ............... H04L 49/90 375/371 |
| 2011/0231566 A1 | 9/2011 | Gelter et al. |
| 2011/0286442 A1* | 11/2011 | Maurice ........... H04W 56/0015 370/350 |
| 2012/0001657 A1* | 1/2012 | Sullivan ............ G01R 13/0254 327/90 |
| 2012/0020417 A1 | 1/2012 | Wei et al. |
| 2012/0144078 A1 | 6/2012 | Poulsen |
| 2012/0326768 A1 | 12/2012 | Bhattacharya et al. |
| 2013/0188657 A1 | 7/2013 | Nedovic et al. |
| 2013/0301634 A1 | 11/2013 | Ehlers et al. |
| 2013/0301635 A1 | 11/2013 | Hollabaugh et al. |
| 2013/0343365 A1 | 12/2013 | Hollabaugh et al. |
| 2014/0068107 A1* | 3/2014 | Rajapakse ......... H04N 21/2368 709/248 |
| 2014/0247834 A1 | 9/2014 | Poulsen |

FOREIGN PATENT DOCUMENTS

| | | |
|---|---|---|
| WO | WO-2010083930 A1 | 7/2010 |
| WO | WO-2012065823 A1 | 5/2012 |

OTHER PUBLICATIONS

IEEE Standard for Local and Metropolitan Area Networks—Timing and Synchronization for Time-Sensitive Applications in Bridged Local Area Networks.

Loeb, et al., "Implementing a Softawre-Based 802.11 MAC on a Customized Platform" CCNC 2009. 6t IEEE, Piscataway, NJ Jan. 2009.

Youssef, at al., "PinPoint: An Asynchronous Time-Based Location Determination System", ACM 2 Penn Plaza, Jun. 2006.

* cited by examiner

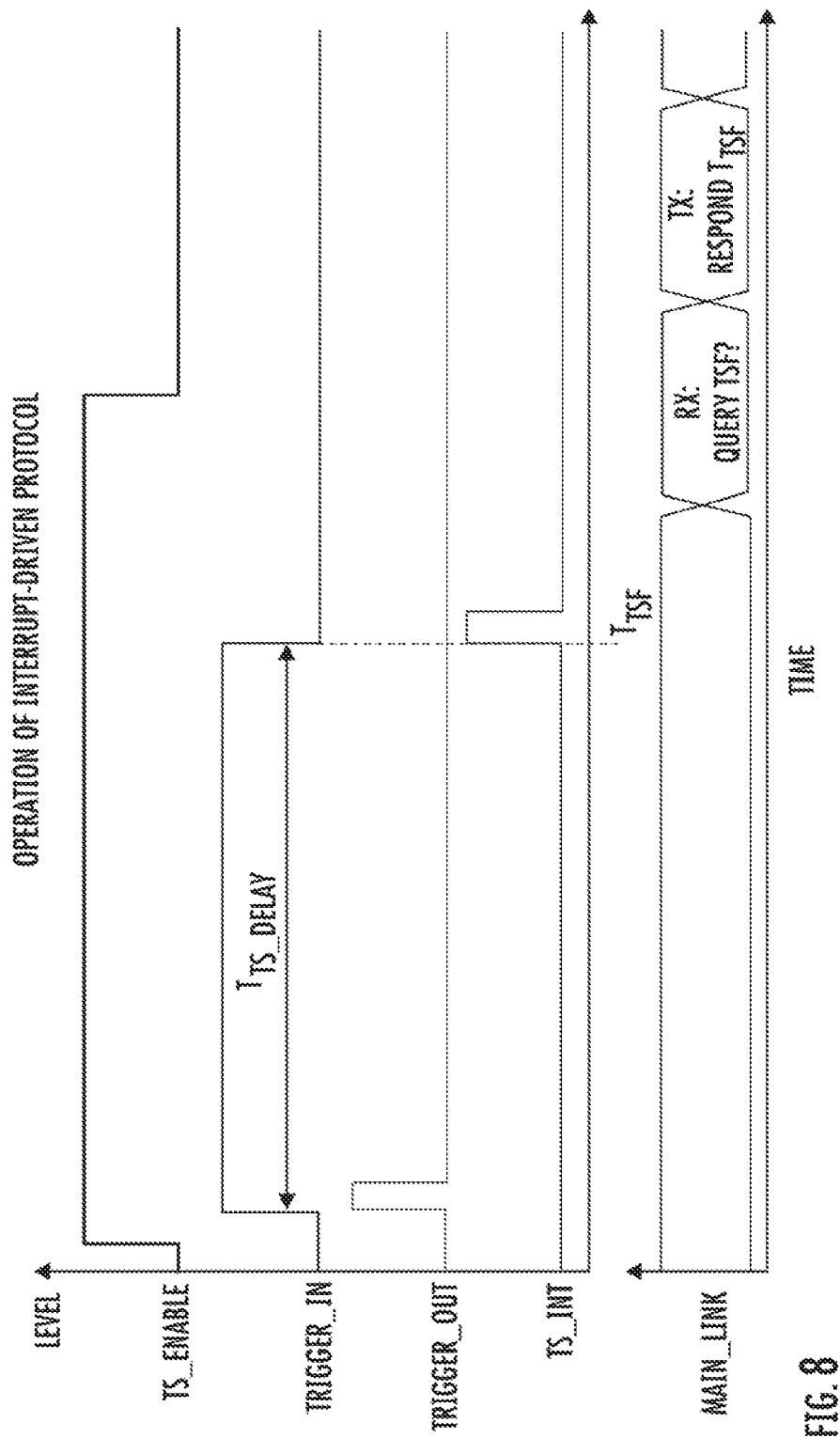

METHODS AND APPARATUS FOR SYNCHRONIZATION OF MEDIA PLAYBACK WITHIN A WIRELESS NETWORK

RELATED APPLICATIONS

This application is related to co-owned and co-pending U.S. patent application Ser. No. 13/604,275 filed Sep. 5, 2012 and entitled "METHODS AND APPARATUS FOR SYNCHRONIZING CLOCK SIGNALS IN A WIRELESS SYSTEM", which claims the benefit of priority to U.S. Provisional Patent Application Ser. No. 61/646,207 filed May 11, 2012 and entitled "METHODS AND APPARATUS FOR SYNCHRONIZING CLOCK SIGNALS IN A WIRELESS TEST SYSTEM", each of the foregoing being incorporated herein by reference in its entirety. This application is also related to co-owned and co-pending U.S. patent application Ser. No. 13/913,297 filed Jun. 7, 2013 and entitled "METHODS AND APPARATUS FOR SYNCHRONIZATION AMONG INTEGRATED CIRCUITS WITHIN A WIRELESS NETWORK", which claims the benefit of priority to U.S. Provisional Patent Application Ser. No. 61/656,908 filed on Jun. 7, 2012 of the same title, each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of multimedia processing. More particularly, the present disclosure is directed to precisely synchronizing media processing within a wireless network.

2. Description of Related Technology

As is well known within the electronic circuit design arts, high speed integrated circuit (IC) design typically requires consistent and accurate distribution of a time reference. Specifically, an accurate time reference is required to, inter alia, ensure that data is processed correctly and consistently throughout the integrated circuit. Media processing is one specific area of the processing arts where timing problems can result in performance issues that are easily perceptible to humans. For example, audio playback with a glitchy or irregular clock can result in audible artifacts and distortions. Similarly, video playback with poor quality clocks may result in visible freezing, "chunking", etc. Typically, video errors on the order of a few milliseconds can be perceived whereas audio errors can be perceived within a few microseconds (the human ear is more sensitive to anomalies).

For example, consider two or more wireless audio devices that are configured to provide a "stereo" and/or "surround" audio experience. If the wireless audio devices are not correctly synchronized, then the audio playback for one speaker will be slightly offset in time from the other speaker(s). Since the human brain interprets perceived volume differences and time differences as being caused by the virtual location of sound sources relative to the human, the slight offset in time will be interpreted as an incorrectly reproduced stereo image. Specifically, the resulting "intertemporal distortion" will be perceived as a stereo image that is not centered, but is off to one side. The human brain can detect time differences as small as 10 microseconds (e.g., typically half an audio sample).

Wireless networks must robustly handle changing radio environments, unknown propagation delays, etc. Generally, wireless devices utilize an internal free-running oscillator to generate internal clocking. Due to manufacturing variance and tolerances in oscillator components, wireless networks must also assume that each device has an imperfect time reference. For this reason, a myriad of synchronization schemes and standards for synchronizing time between wireless devices have been developed. Typical solutions for network synchronization regularly provide time information across the wireless network; each device of the network determines an appropriate adjustment to its local free-running clock. Existing wireless synchronization techniques are accurate to only within a few milliseconds (which is magnitudes greater than the human brain's audio acuity).

Moreover, even though wireless systems can synchronize their internal clocks to a common time reference for modem operation, typical media processing is performed via a separate processor (e.g., an application processor). Accordingly, distortion-free media playback also requires that the media sub-system can receive a high quality time reference from the modem chip.

SUMMARY

The present disclosure provides, inter alia, improved apparatus and methods for precisely synchronizing media processing within a wireless network.

A method for precisely synchronizing media processing within a network is disclosed. In one embodiment, the method includes: receiving a common time stamp of a common time reference; receiving media data associated with the common time reference; deriving a local version of the common time reference for media playback based on the common time stamp; and playing the media in accordance with the derived time reference.

In one variant, the network comprises a wireless local area network (WLAN) and the common time reference comprises a time synchronization function (TSF) value received via a beacon. In some such variants, the local version of the common time reference is clocked from a free running clock oscillator. In some implementations, deriving the local version of the common time reference comprises determining a rate mismatch between the local version of the common time reference and the common time reference. In still other implementations, the determination of rate mismatch is based on an analysis of a plurality of observed time stamps and an ideal timeline derived from the plurality of observed time stamps.

A method for interrupt driven time synchronization within a device is disclosed. In one embodiment, the method includes: generating a common event between a first and a second processor; observing a first number of clock cycles of the first processor during the common event; observing a second number of clock cycles of the second processor during the common event; determining a rate mismatch based on the first and second number; correcting one or more media samples for playback on the first processor based on the determined rate mismatch; and where the one or more media samples are provided by the second processor.

In some variants, the common event comprises a pulse width generated by the first processor setting a latch, and responsively the second processor resetting the latch. In some cases, the method also includes receiving one or more time stamps via a main link. In such variants, the received one or more time stamps may be associated with at least one edge of the pulse width.

A wireless media device configured to receive media via a wireless network is disclosed. In one embodiment, the wireless media device includes: a first and a second processor; a first clock associated with the first processor and a second clock associated with the second processor; and a non-transitory computer readable medium comprising one or more instructions. In one exemplary embodiment, the one or more instructions are configured to cause the first processor to, when executed: request a time synchronization event; observe a first number of first clock cycles of the first clock during a common event; receive a second number of second clock cycles of the second clock during the common event; and determine a rate mismatch based on the first and second number; and correct one or more media samples for playback based on the determined rate mismatch.

In one variant, the first and second processor comprise an application processor and a wireless modem. In one exemplary variant, the one or more instructions are further configured to cause the first processor to, when executed: set a latch; where the second processor is configured to responsively reset the latch; and measure a pulse width generated by the latch. In some variants, the media comprises one or more audio data streamed via the wireless network.

In other variants, the wireless modem is time synchronized to the wireless network. In certain implementations, the one or more instructions are further configured to cause the first processor to, when executed: receive a time stamp via an out-of-band link with the second processor, the time stamp associated with the common event.

In some variants, the one or more media samples are streaming audio samples.

In still other variants, the second clock is selected to oscillate at a frequency that is substantially similar to a radio frequency of the wireless network. In some implementations, the first clock is selected according to one or more processor capabilities.

In some variants, the received second number of second clock cycles is received via an out-of-band link with the second processor.

In other variants, the rate mismatch is determined based on historic measurements.

Other features and advantages of the present disclosure will immediately be recognized by persons of ordinary skill in the art with reference to the attached drawings and detailed description of exemplary embodiments as given below.

BRIEF DESCRIPTION OF THE DRAWINGS

FIG. 8 is a signaling diagram of one exemplary interrupt-driven time synchronization scheme between the modules of FIG. 7.

All Figures © Copyright 2014 Apple Inc. All rights reserved.

DETAILED DESCRIPTION

Reference is now made to the drawings, wherein like numerals refer to like parts throughout.

DETAILED DESCRIPTION OF EXEMPLARY EMBODIMENTS

Exemplary embodiments are now described in detail. While these embodiments are primarily discussed in the context of multiple devices and/or internal components performing audio data processing within a wireless local area network (WLAN), the general principles and advantages may be extended to other wireless or wired networks where time synchronization cannot be performed in a timely fashion with straightforward messaging, and/or other applications where time synchronization is critical (e.g., video media, multimedia, network gaming, etc.), the following therefore being merely exemplary in nature.

Exemplary Network of Devices—

Figure 1:
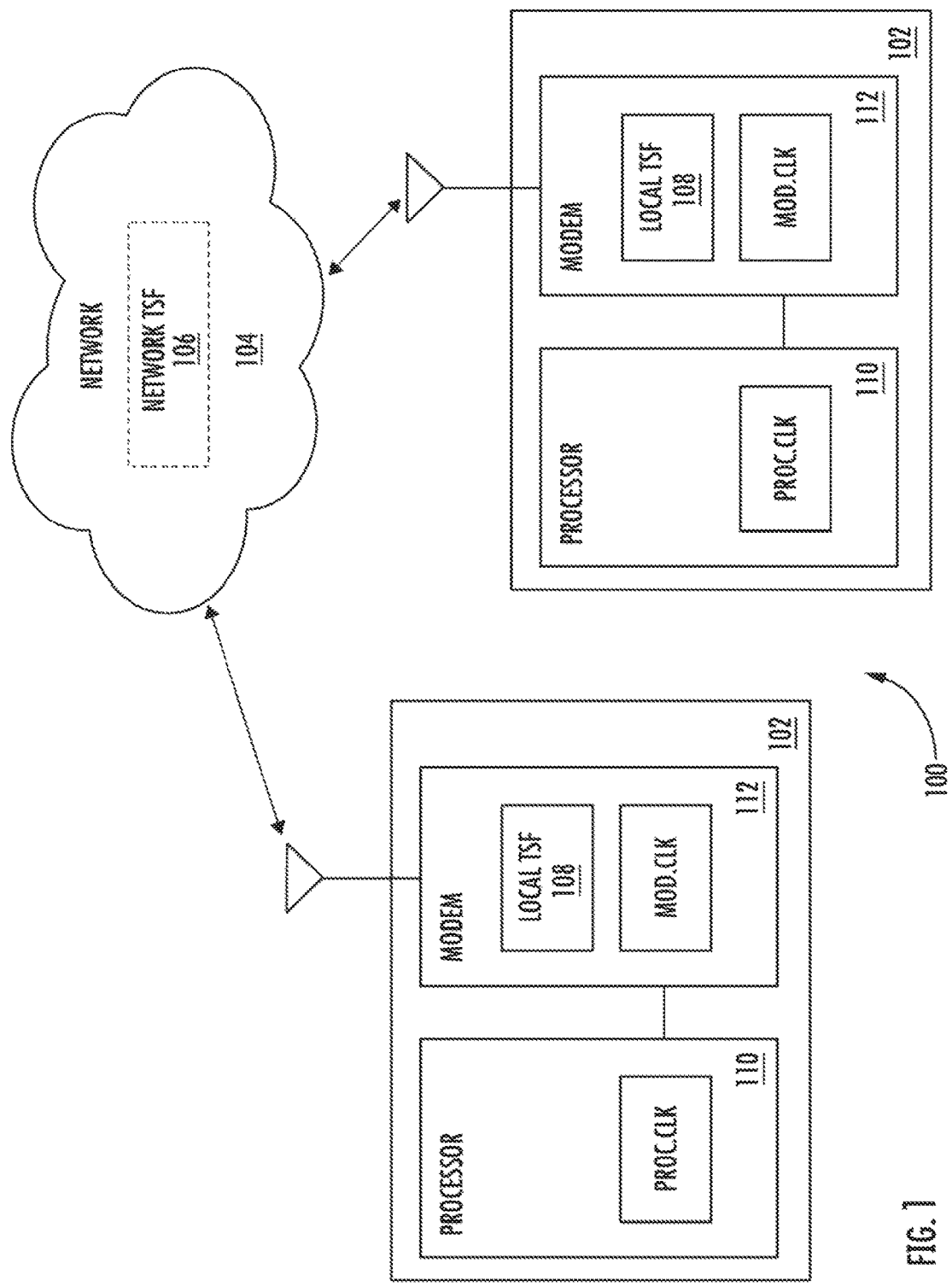
FIG. 1 is a logical block diagram representation of one exemplary network of devices useful in conjunction with the various principles described herein.

FIG. 1 illustrates one exemplary network 100 of devices 102 useful in conjunction with the various principles described hereinafter. As shown, the exemplary network includes multiple wireless devices 102 which are connected via a wireless local area network (WLAN) 104. The exemplary WLAN has a common time base 106 according to a timing synchronization function (TSF). As a brief aside, each device maintains a local version of the TSF 108 timer counting in increments of microseconds (µs). At frequent intervals, the devices 102 of the network 100 receive (or transmit) a timing beacon which include a TSF value; each device sets its TSF timer to the timestamp of the beacon. Depending on the WLAN configuration, the TSF may be aligned to a master time reference (provided by one of the devices or another network entity), or may be generated on an ad hoc basis by the various devices 102 of the network 100.

Each device 102 is a media processing device that further includes at least an application processor 110 configured to process media and a modem processor 112 configured to connect to the wireless network. Processing devices in general utilize a clock which is generated from an internal crystal that is configured to oscillate at the appropriate frequency (or a derivable variant thereof). Typical implementations of the application processor 110 and the modem processor 112 have independent crystals; for example, the modem crystal is selected to oscillate at a frequency that is substantially similar to the radio frequency whereas the processor crystal is selected according to the processor capabilities. As previously alluded to, the devices cannot rely on their individual oscillators for timing reference due to the manufacturing variance and tolerances in oscillator components. This is particularly problematic for media playback, where perceptible errors can detract from the user experience.

Accordingly, in one exemplary embodiment of the present disclosure, the wireless devices utilize the common TSF 106 in order to derive and/or adjust a local time reference. More generally, various aspects of the present disclosure are directed to precision synchronization over time, based on repeated measurements of a common time reference.

In another exemplary embodiment of the present disclosure, the application processor and the modem processor measure a pulse width and the aforementioned common TSF 106 in order to adjust media playback. In one exemplary implementation, the pulse width is generated by setting a latch and firing an interrupt to reset the latch. More generally, various aspects of the present disclosure are directed to deriving a time base for media playback based on an interrupt driven time synchronization.

In still another embodiment of the present disclosure, the modem processor is configured to communicate a high quality time reference of the modem chip to the application processor, or a relationship between the time reference of the modem chip and the time reference of the application processor can be jointly determined. In one exemplary embodiment, the application processor and modem processor are each coupled to and configured to set and reset (respectively) a hardware latch with very high time accuracy. During operation, the application processor sets the latch (resulting in a rising edge), and notes its own precise local time instant of the rising edge. Thereafter, the modem processor resets the latch (resulting in a falling edge), and notes its own precise time instant of the falling edge. Both the application processor and the modem processor each observe the overall pulse width (which is common to both processors) by counting a number of clock cycles on their respective local clocks. Since each processor has a precise time instant relative to the pulse width (e.g., the rising edge for the applications processor, the falling edge for the modem processor), each processor can independently determine the difference in the other processor's clock based on a difference in counted clock cycles.

More generally, various aspects of the present disclosure are directed to a common observation of an external timing event for multiple processors, which enable the processors to determine a time reference to a high degree of precision. In various embodiments, the external timing event may be generated from one or more dedicated hardware component (e.g., a SR latch, low latency general purpose input output (GPIO), etc.)

Various other aspects of the present disclosure will be readily understood by those of ordinary skill in the related arts, given the contents of the present disclosure.

Methods—

Figure 2:
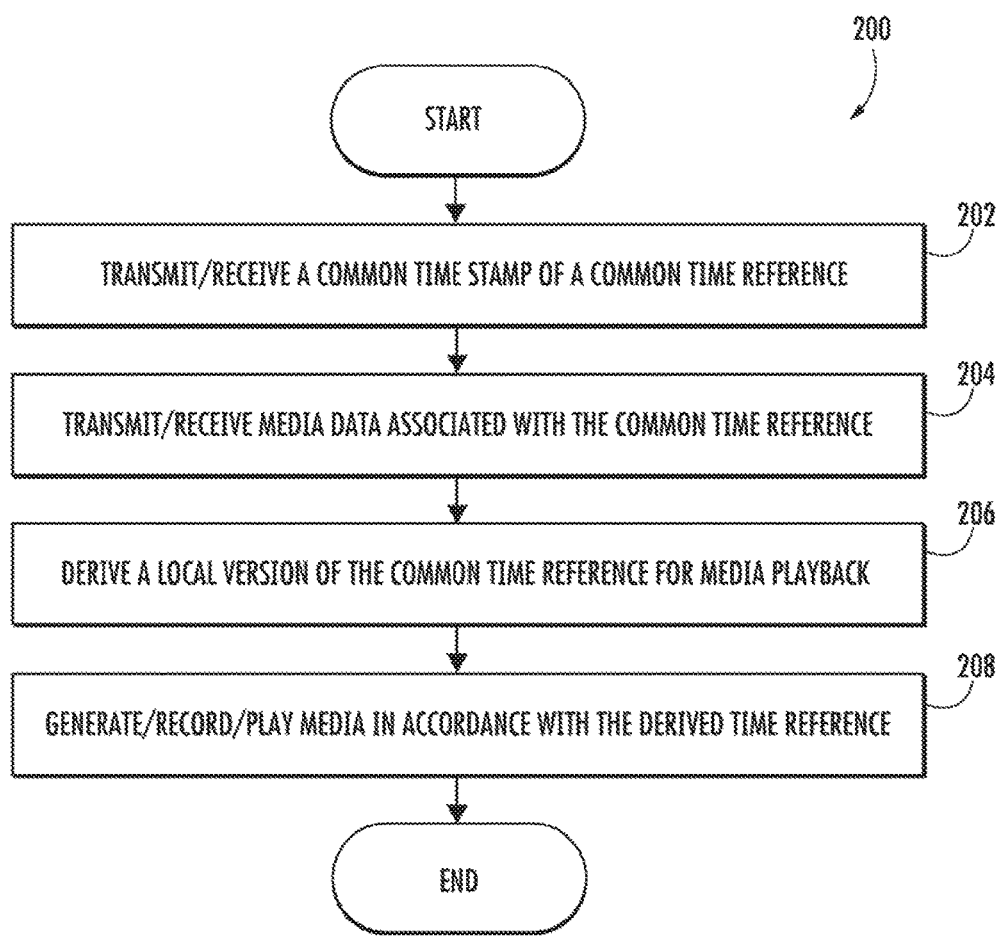
FIG. 2 is a logical flow diagram of one generalized method for precisely synchronizing media processing within a network.

FIG. 2 illustrates one exemplary logical flow diagram for a generalized method 200 for precisely synchronizing media processing within a network. In one exemplary embodiment, the network is a wireless network and the device is a wireless device of the wireless network. In some variants, the wireless network may additionally be configured as a portion of a larger network infrastructure, or alternatively as an ad hoc or peer-to-peer wireless connection. Common examples of wireless technologies include, without limitation, Wireless Local Area Networks (e.g., IEEE 802.11, IEEE 802.16, etc.); Bluetooth; and cellular networks (e.g., Long Term Evolution (LIE), Universal Mobile Telecommunications System (UMTS), CDMA2000, etc.)

While the disclosed embodiments are primarily discussed in view of wireless networks, it is readily appreciated that in other embodiments, the network is a wired network and each device is physically connected. Common examples of wired technologies include without limitation e.g., Universal Serial Bus (USB), FireWire, etc. In still other embodiments, the network may be a hybrid network having wired and wireless network portions.

At step 202 of the method 200, a device transmits and/or receives a common time stamp of a common time reference. The transmission or reception may be broadcast, multi-cast or unicast. In some instances, the device may both receive a common time stamp and relay the time stamp to another device of the network (with an indicated delay). In some variants, the transmission or reception of the common time stamp may be performed via an out-of-band connection. In other variants, the transmission or reception of the common time stamp may be included as a portion of other regular signaling (e.g., a beacon, etc.).

In one exemplary embodiment, the common time stamp is shared with all the devices of the network. In other embodiments, the common time stamp is limited to only a portion of the network and/or a portion of the devices. In some embodiments, the common time stamp is distributed by a master node of the network; alternatively, various nodes of the network may interchangeably provide a common time stamp.

In one exemplary embodiment, the common time stamp is a time synchronization function (TSF) value which is a $2^{64}$ incrementing count of microseconds. More generally however, the term "time stamp" refers to any recordation of a time event. Typical implementations of time stamps include without limitation: a string of characters representing a time (e.g., HH:MM:SS.SSS), an incrementing counter value, a decrementing counter value, etc. In some variants, the time stamp may further be associated with an accurate "edge" event. A so-called "edge" event is typically generated by dedicated hardware, so as to precisely designate a moment in time (e.g., with much greater accuracy than software may otherwise provide). In some cases, a time stamp may be associated with an edge that has previously fired, in other cases the time stamp may indicate the time at which an edge event will occur.

As a brief aside, unlike other forms of digital logic which are based on logical levels (e.g., logical high ("1"), and logical low ("0")), so-called "edge", "edge-triggered", "edge signaling", etc. refers to logic configured to identify/produce signal transitions to denote a precise moment in time. Edge-triggered circuitry is classified as so-called "rising edge" or "falling edge". Rising edge circuitry is configured according to low-to-high signal transitions. Falling edge circuitry is configured according to high-to-low transitions. Still other implementations may be based on so-called "leading edge" or "following edge" logic. Various substitutions in edge-based logic are well within the skill of an artisan of ordinary skill in the arts.

At step 204 of the method 200, the device transmits and/or receives media data associated with the common time reference. In one exemplary embodiment, the media data includes one or more of audio and visual (AV) data which are configured for playback according to a specified time.

Media data may be received synchronously, asynchronously, and/or isochronously. Common examples of AV data include without limitation: MPEG, PEG, AVI, AIC, AAC, MOV, H.264, etc. While the following examples are presented primarily in the context of AV playback, it is recognized that the principles described herein may readily apply to any time-sensitive, and/or human interaction type application including for example, video gaming, human interface devices (e.g., wireless keyboards, wireless mice, etc.), internet connectivity, etc.

In one exemplary embodiment, the media data is associated with specified times for playback. For example, playback may need to occur at a specified time, or no earlier than, or no later than, specified time intervals. In other embodiments, the media data is associated with a specified rate of playback.

In one exemplary embodiment, the media data is transmitted and received by all the devices of the network. In other embodiments, the media data is provided by some devices of the network for playback at other devices. In still other embodiments, a common media file is distributed by a master node of the network.

At step 206 of the method 200, the device derives a local version of the common time reference for media playback based on the common time stamp. In some embodiments, the derived time reference is a free running clock which is periodically corrected to the common time stamp. In other embodiments, the derived time reference is a running clock which has a rate that is adjustable; the rate is adjusted so as to closely align to the rate of the common time stamp.

As a brief aside, clock generation is typically performed by one or more of the following hardware elements: frequency locked loops (FLL), phase locked loops (PLL), and delay locked loops (DLL). A FLL is configured to generate a signal that is locked to the frequency of an input or "reference" signal. A PLL is configured to generate a signal that is locked to the phase of an input signal. A DLL is configured to generate a delayed version (by a constant phase) of an input signal. Software can measure a difference in clock rates by comparing the number of edges within a fixed time period.

Generally, it is appreciated that clock generation solutions may include a feedback loop, and/or adjustable control for changing, tracking, and/or calibrating the output frequency. In some cases, the clock generation solution may include a "loadable" register, which can be used to seed or correct to an appropriate time value.

For example, in one exemplary embodiment, a common TSF is a counter value which increments once every microsecond. A local version of the TSF is also incrementing once every microsecond. By comparing the common and local TSF values (and their rate of change relative to one another), the device can infer the relative difference in clock speed (e.g., whether it is running faster or slower than the network clock). The relative difference in clock speed can be used to adjust the derived clock. During operation cases, the local version of the TSF may additionally be corrected to the common TSF (however, it is appreciated that in other network technologies, the local time reference may freely run).

At step 208 of the method 200, the device generates/records/plays the media in accordance with the derived time reference. In some embodiments, the media is generated/recorded/played according to the derived time reference. In other embodiments, the media is resampled and/or reconstructed (e.g., interpolated or extrapolated) according to the derived time reference.

Figure 3:
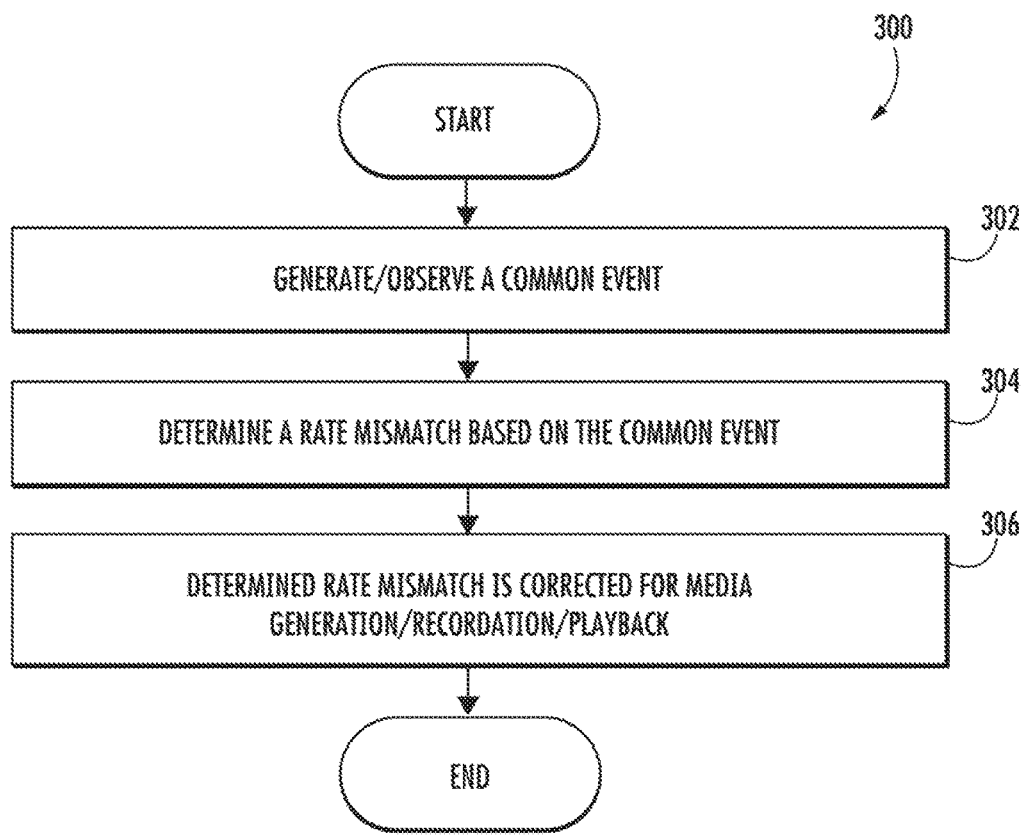
FIG. 3 is a logical flow diagram of one generalized method for interrupt driven time synchronization within a device.

FIG. 3 depicts one exemplary logical flow diagram for a generalized method 300 for interrupt driven time synchronization within a device. In one exemplary embodiment, the time synchronization occurs within a device via chip-to-chip interconnect signaling. While the following sequence is described with respect to a first processor being a time receiver and a second processor being a time transmitter, it is readily appreciated that the following sequence may be bi-directional (e.g., that both processors interchangeably function as time receivers and time transmitters). Moreover, the following exchange is discussed with reference to a WLAN modem chip and an application processor, however artisans of ordinary skill will readily appreciate that the various principles described herein are applicable to a wide range of applications, the disclosed architecture being merely illustrative.

At step 302 of the method 300, the first and second processors generate and/or observe a common event. In one exemplary embodiment, a first processor (e.g., the time receiver) sets a first time accurate event. Responsive to the first time accurate event, a second processor (e.g., the time transmitter) sets a second time accurate event. In one exemplary embodiment, the first and second time accurate events are edge signals. In some variants, the time accurate events may additionally be associated with corresponding time stamps.

In one exemplary implementation, the first and second time accurate events set and reset, respectively, a latch. When the latch is set, the latch generates a logic high; when reset, the latch generates a logic low. The resulting pulse width between the first and second time accurate events is commonly observed by both the time receiver and time transmitter.

While the foregoing example is based on a common event that is jointly generated by the first and second processor, those of ordinary skill in the related arts will readily appreciate that virtually any commonly observable event may be used. Moreover, multiple, one, or none, of the processors may be involved in the generation of the observable event. For example, the device may internally generate a common observable event and/or receive a common time reference via out-of-band signaling, etc. Examples of commonly observable events include without limitation: signal edges, pulse widths, running counters (e.g., incrementing, decrementing, shared clocks, etc.

In some embodiments, the common event is generated multiple times. For example, in some cases, the common event is a periodically occurring event. In other embodiments, the common event occurs on an as-needed basis, or on an as-requested basis. In one such variant, a processor may initiate or request a time synchronization event based on a condition e.g., on power-up, on wake-up, in preparation for an upcoming data transfer, an error rate exceeding a maximum threshold, etc.

At step 304 of the method 300, the first and second processors determine a rate mismatch based on the common event. In one exemplary embodiment, the first and second processors each independently determine a number of clock pulses (of their respective local clocks) that correspond to a commonly observed pulse width. By exchanging the determined number, the first and second processors can determine a rate mismatch between their respective local clocks. For example, during a commonly observed pulse width, if the first processor observes 100 clock edges of a corresponding first clock, and the second processor observes 90 clock edges of a corresponding second clock; then the second clock is running at 90% of the first clock (i.e., 90/100) and the first clock is running at 111.11% of the second clock (i.e., 100/90).

Each individual rate mismatch measurement may have some amount of error associated therewith. Accordingly, in some embodiments, the first and second processor analyze a current rate mismatch within the context of historical data (e.g., previously gathered mismatch data), so as to improve the estimation accuracy. In some cases, the first and second processor may weight various rate mismatch determinations so as to optimize for estimation accuracy, settling time, etc. For example, large rate mismatches may be emphasized to improve responsiveness (i.e., the amount of time required for the two processors to achieve synchronization), or alternatively large rate mismatches can be disregarded as outlier data points.

At step 306 of the method 300, the determined rate mismatch is corrected for media generation/recordation/playback. In some embodiments, the processors adjust their clocks based on the determined rate mismatch. In other embodiments, the processors merely adjust the rate at which the media is consumed (e.g., based on resampling, etc.).

Exemplary Asynchronous Sample Rate Converter (ASRC)—

Consider the following use scenario, a first digital audio device is connected to a wireless network and transfers an audio file to a second digital audio device for playback. Existing solutions phase-lock and frequency-lock the hardware audio clocks on both devices using a phase-locked loop (PLL), and synchronize playback on both devices at the same sample. This ensures that each device's digital-to-analog converter (DAC) converts the same samples at the same time, and results in an analog output that is synchronized between devices. However, from a practical standpoint, humans only perceive whether the analog output signal is synchronized; the human listener is unable to tell from the analog output whether the two different devices on the network are frequency or phase locked. Moreover, actual space and frequency synchronization of two different devices on the same wireless network can be difficult to guarantee.

Accordingly, in one exemplary embodiment of the present disclosure, each device includes an asynchronous sample rate converter (ASRC) that allows their respective clocks to run at a different rates, and send audio data sample values to the other device's DAC. The sample values are recalculated such that the process of digital to analog conversion results in an analog output that is synchronized between devices. More generally, the ASRC provides a sample timeline that is aligned to the network clock, and is therefore aligned to all other ASRC that share the common network clock.

Figure 4A:
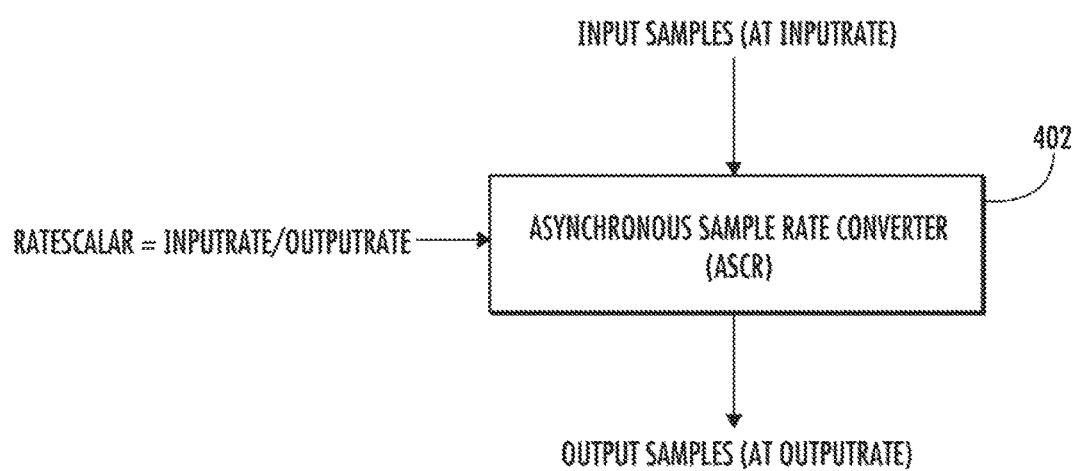
FIG. 4A is a logical block diagram representation of an Asynchronous Sample Rate Converter (ASRC) that accepts samples at one sample rate, and outputs the same signal resampled to a new sample rate.

As shown in FIG. 4A, in one exemplary embodiment, an ASRC is a digital signal processing (DSP) block 402 that accepts samples at one sample rate, and outputs the same signal resampled to a new sample rate. A rate scalar parameter defines a ratio of the input and output sample rates. This parameter can be adjusted during operation, and allows for precise changes in the sample rate while audio is running. Any time an ASRC is present, there are two sample rates to consider: the input rate (i.e., "above") the ASRC and the output rate (i.e., "below") the ASRC.

Figure 4B:
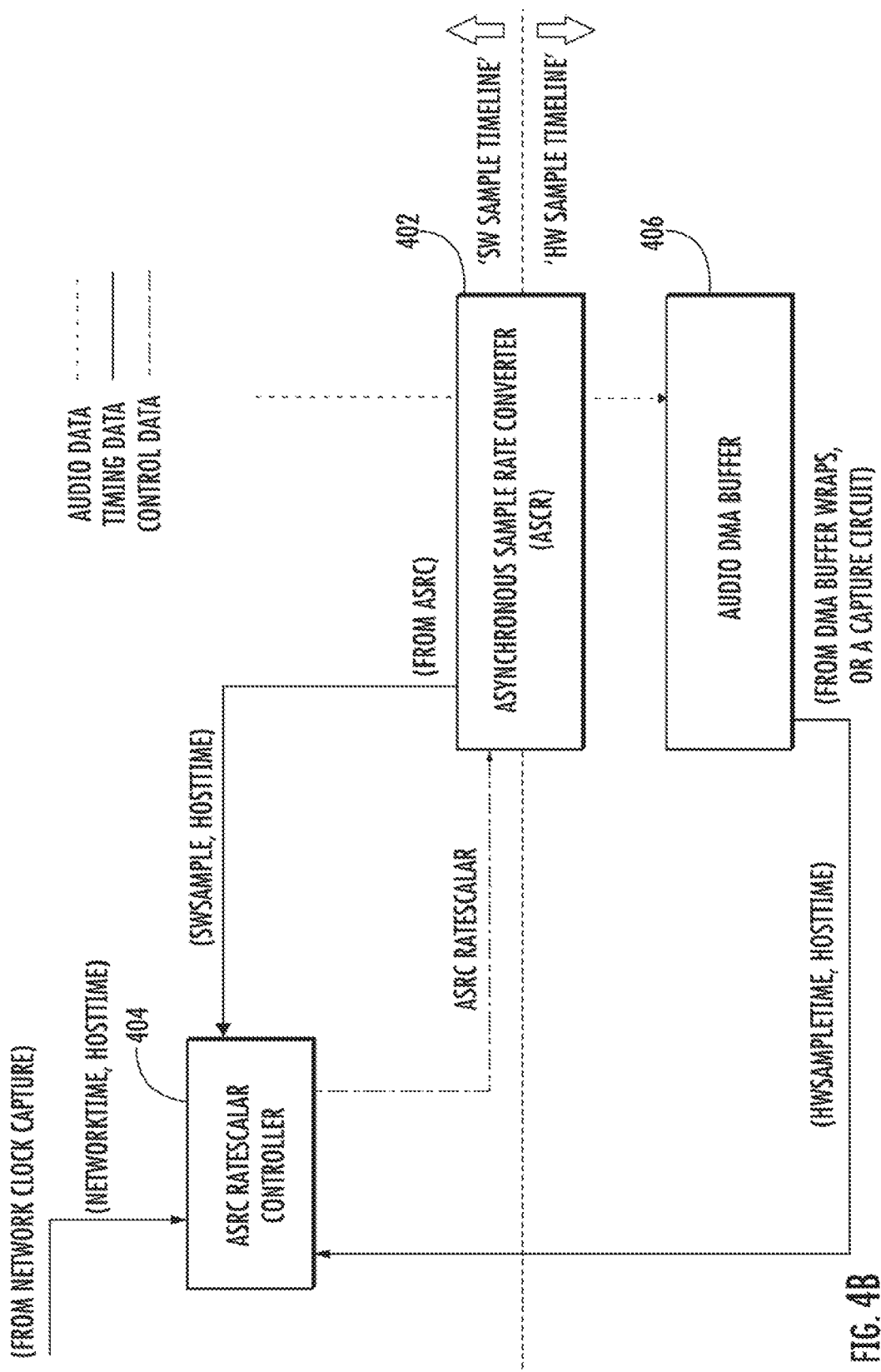
FIG. 4B is a logical block diagram representation of one exemplary system configured to align a stream of audio samples to a network clock, in accordance with the various principles described herein.

FIG. 4B illustrates one exemplary system 400 configured to align a stream of audio samples to a network clock. As shown, the ASRC 402 is controlled via an ASRC rate scalar Controller 404, and is configured to receive audio data, timing data, and control data from the network, and provide resampled audio data to an audio direct memory access (DMA) buffer 406.

As used herein, the term "host time" (HT) refers to the local device's time. In one such embodiment, the HT are values (e.g., time stamps) generated from a device's local counter, driven by a local crystal oscillator. In contrast, the term "network time" (NT) refers to a value generated from a counter common to all the devices of the network.

As used herein, the term "hardware sample time" (HWST) refers to a value from a counter below the ASRC (i.e., after rate conversion by the ASRC), corresponding to the sample index of the hardware. As used herein, the term "software sample time" (SWST) refers to a value above the ASRC (i.e., before rate conversion by the ASRC), corresponding to the sample index of the media being played.

As used herein, the term "timeline" refers generally to the sequential progression of time values. For example, the HT timeline refers to the sequential progress of HT time stamps.

Additionally, as used herein, the term "Super Network Time" (SuperNT) is an NT that when multiplied by SWST, is evenly divisible by the network rate. Specifically, a SuperNT satisfies the equation:

$$NT * \frac{SW\,ST\,Rate}{NT\,Rate} \in \mathbb{Z} \quad (1)$$

Finally, as used herein, the term "anchor pair" is a SuperNT that is paired with a SWST that establishes the desired phase between NT and SWST. After the anchor pair has been set, the SWST is moved forward at the SWST rate, where time is defined by the network clock.

In one exemplary embodiment of the present disclosure, each device of the network has an ASRC. The output of the ASRC is determined by the appropriate hardware considerations (e.g., audio reproduction quality, codec rates, etc.), the ASRC is configured to receive media data from the network and asynchronously convert the media data to the appropriate output rate based on the tunable rate scalar parameter derived from the event data (or the network time). In some embodiments the rate scalar parameter is adjusted at regular and/or periodic intervals during playback, so as to allow the input rate to dynamically change over time so as to dynamically adjust for e.g., bandwidth congestion, processing capability, etc.

Figure 5A:
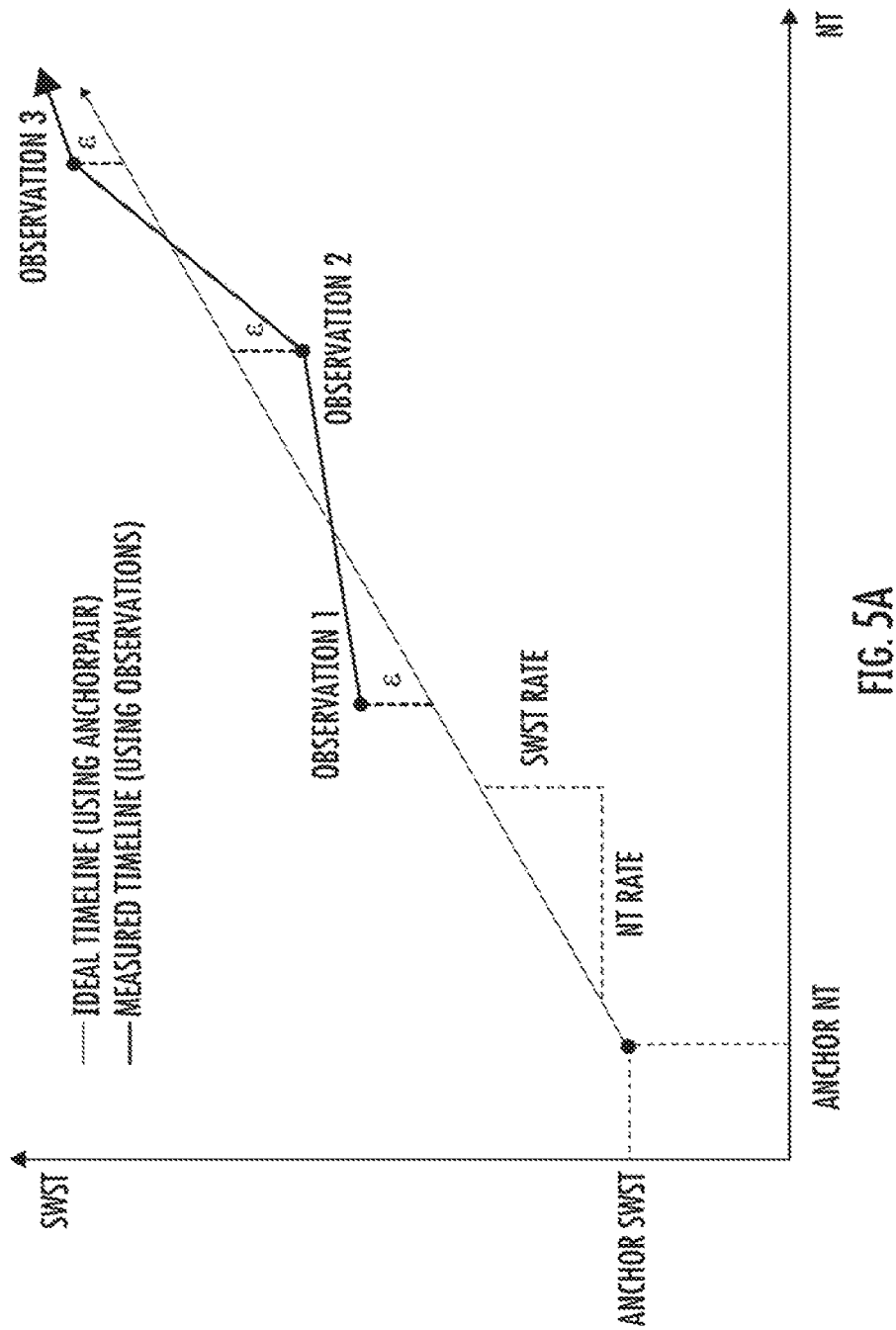
FIG. 5A is a graphical representation of a comparison of error between an ideal and observed timeline, in accordance with the various principles described herein.

In one embodiment, the audio is synchronized based on one or more tracked timelines. In one exemplary implementation, each device tracks the other timelines with respect to its own HT. By pairing the tracked statistics with respect to the common HT (e.g., [NT, HT], [HWST, HT], and [SWST, HT]), conversion between all of the timelines is greatly simplified (e.g., all of the timelines can be converted to HT, and HT can be converted to any of the other timelines). FIG. 5A illustrates one such comparison between two timelines. As shown, even though each individual observation may have some error; a historical analysis of multiple observations can be used to estimate a more accurate relationship between the timelines (e.g., based on a best fit linear analysis, etc.). More directly, the progression of the observed data points (collectively, the "observed timeline") can be compared to an "ideal timeline" (which is a mathematically relationship determined based from the observed timeline), and the error can be measured. The difference between the ideal and observed values can be used as feedback to adjust operation of the ASRC (e.g., by changing the rate scalar parameter).

Figure 5B:
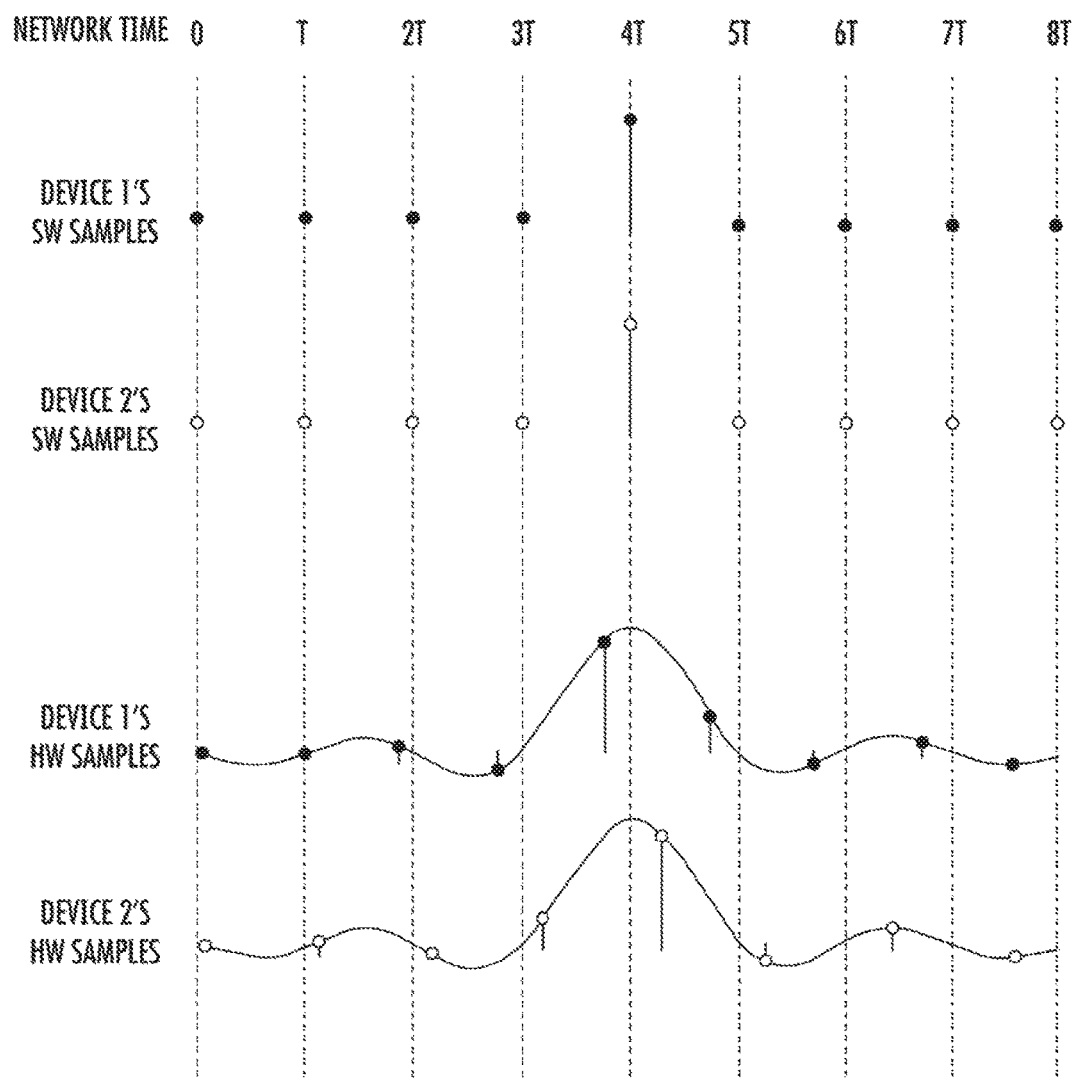
FIG. 5B is a graphical representation of various data samples which have been synchronized, in accordance with the various principles described herein.

If every device of the network minimizes the error between ideal and observed timelines, the observed software samples at each device will be synchronized to the other devices when they are converted to hardware samples. For example, as shown in FIG. 5B, the received software samples are the same between the first and second device. However, they result in slightly different hardware data samples. Still, when each device of the network has appropriately adjusted its rate scalar parameter to synchronize to the network, then the analog output of playback will be synchronized (even though the resulting hardware samples of each device may be different).

While the foregoing example is presented as one simple implementation, it is appreciated that more complex implementations may incorporate line fitting, interpolation, extrapolation, etc.

Figure 6:
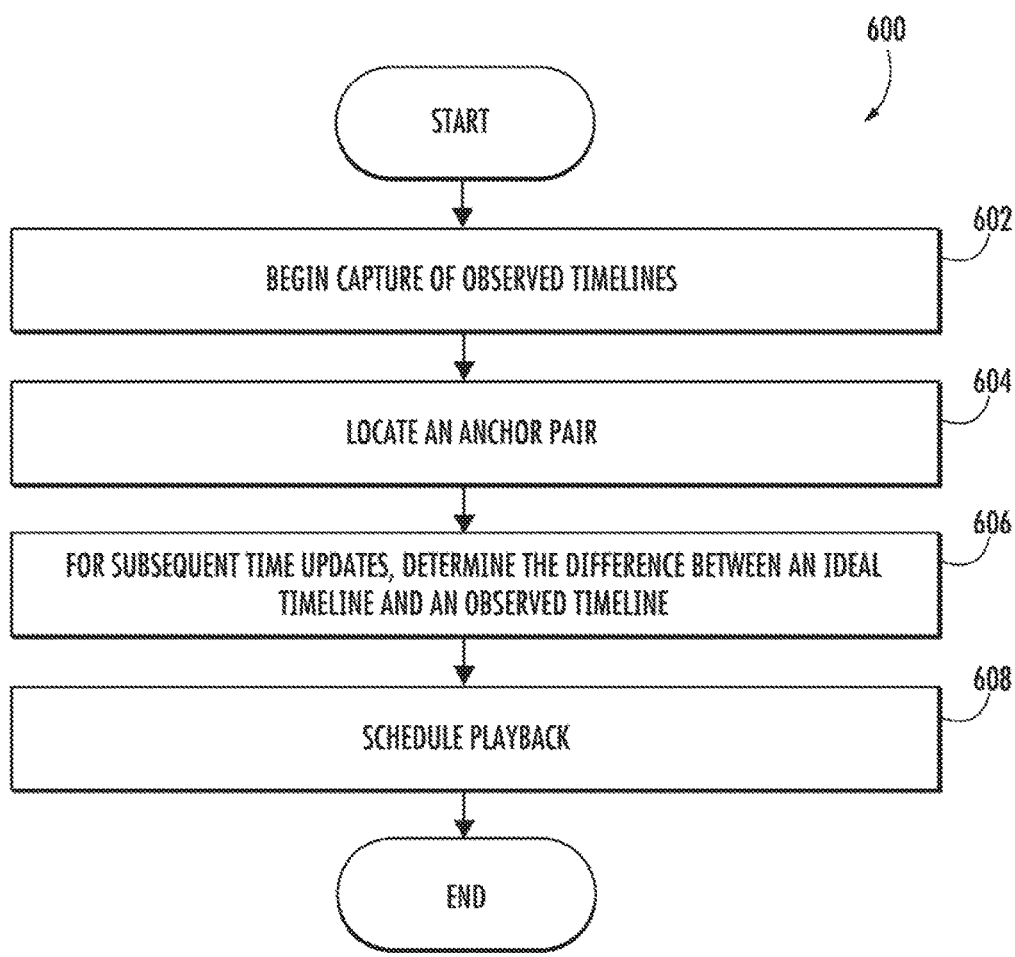
FIG. 6 is a logical flow diagram illustrating one exemplary method for asynchronous sample rate conversion.

FIG. 6 illustrates one logical flow diagram illustrating an exemplary method 600 for asynchronous sample rate conversion in accordance with the principles described herein.

At step 602 of the method 600, when audio playback is initiated, responsively the device begins capture of one or more observed timelines (e.g., the ordered pairs [HWST, HT] and [SWST, HT], etc.). In some cases a local timeline (e.g., the ordered pair [NT, HT]) is independent of audio playback and is continuously tracked (i.e., is not triggered by audio playback). More directly, the HWST provides a reference as to the time of the device's local audio codec; the SWST provides a reference as to the time of the source's software application (which is generating the media data).

It is necessary to determine how the software application's sense of time is changing with respect to the network time reference. In one exemplary embodiment, an anchor point is present where the received samples from the network (SWsamples) align with the SuperNT; in other words, an anchor point represents the condition where there is no phase difference between the software samples and the network time. Accordingly, at step 604, the device locates an anchor pair and establishes the desired phase between NT and SWST.

Ideally, the media samples produced according to the SWST should be played back at the same rate as they were generated. The device only has a sense of its own HT, but shares a NT with the source. Accordingly, by converting the SWST to an NT, and maintaining the rate of play consistent with the NT, the resulting media stream should be synchronized. However, since the NT may drift relative to the SWST, it is necessary to correct for the drift.

Accordingly, at step 606 of the method 600, at subsequent time updates, the devices determine a difference between an ideal timeline and the observed timeline. In one exemplary embodiment, anytime an updated NT is observed, the device determines the difference between the ideal SWST (based on the predicted rates), and the actually observed SWST. The resulting error signal is used to adjust the rate scalar parameter of the ASRC (step 608 of the method 600). So long as the rate scalar parameter is frequently adjusted, the devices will remain rate-locked and phase-locked.

Finally, at step 608 of the method 600, media playback is scheduled. In one embodiment, the first sample is scheduled for playback on a SuperNT. If both devices start their playback at the same SuperNT, and the devices remain rate-locked and phase-locked, then the playback will be synchronized.

Exemplary Interrupt Driven Time Synchronization—

Figure 7:
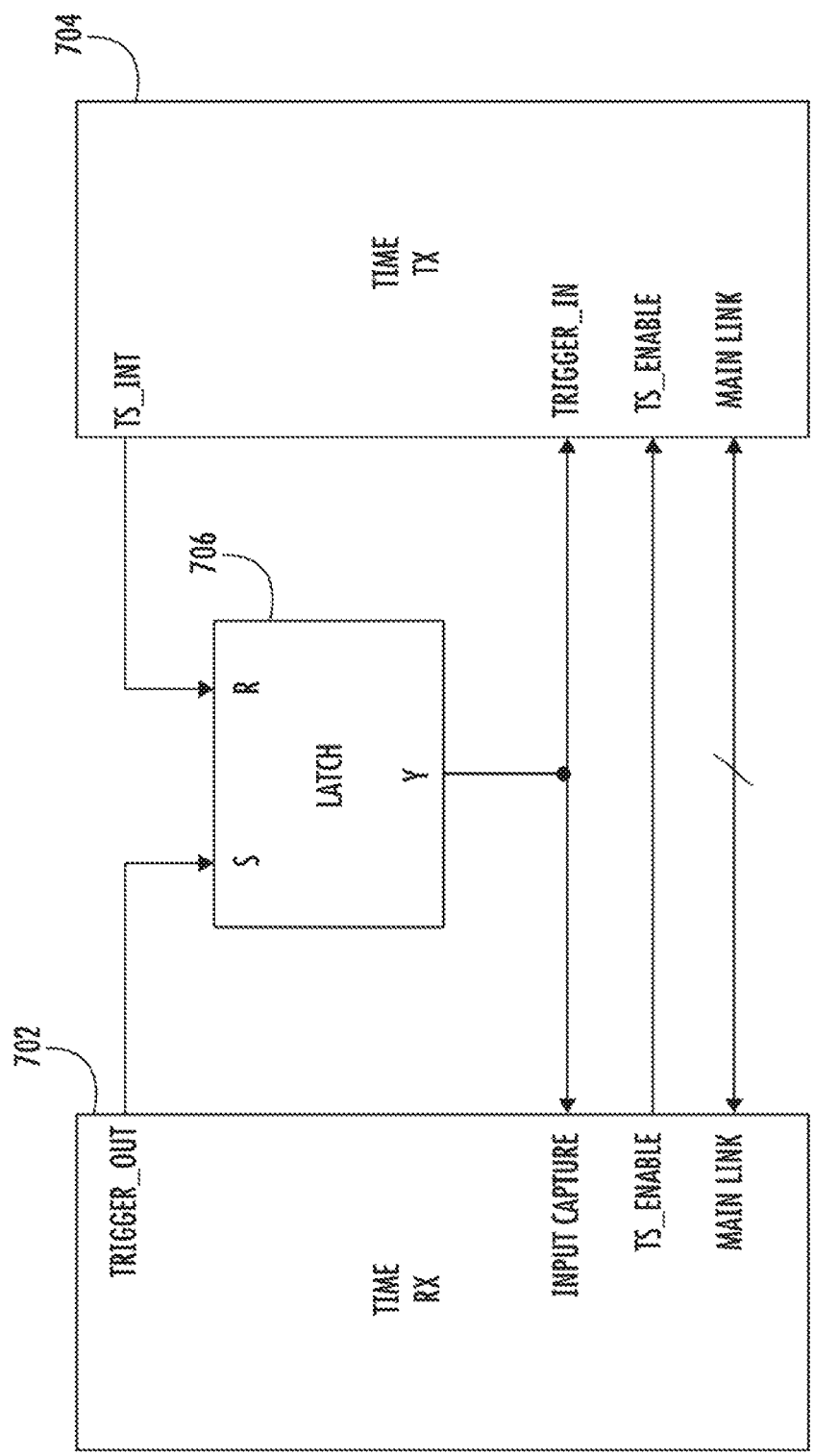
FIG. 7 is a logical block diagram representation of two modules with independent clock domains.

Referring now to FIG. 7, one exemplary embodiment of an interrupt-driven time synchronization scheme between two modules with independent clock domains is illustrated. In the exemplary embodiment, a time transmitter 704 is configured to communicate information about its clock to a time receiver 702. The time receiver 702 is configured to calculate a rate of mismatch, and use the calculated rate of mismatch to model the clock domain of the time transmitter 704.

As shown, the exemplary system includes a time receiver 702, a time transmitter 704, and a Set-Reset (SR) latch 706. The time receiver 702 and time transmitter 704 are connected via a main link and general purpose input/outputs (GPIOs) that are configured to capture time synchronization signaling, as described in greater detail infra. As shown, various implementations may additionally provide enable signaling (TS_Enable) to control when time synchronization occurs.

As shown, the time receiver 702 and time transmitter 704 each include a processing subsystem that may also include an internal cache memory. Each processing subsystem is connected to a memory subsystem including memory, which may for example, include SRAM, flash and SDRAM components. The memory subsystem may implement one or a more of DMA type hardware, so as to facilitate data accesses as is well known in the art. The memory subsystem contains computer-executable instructions which are executable by the processor subsystem.

FIG. 8 is a signal diagram of an exemplary interrupt-driven time synchronization scheme, useful with the modules of FIG. 7. As shown, in one exemplary embodiment, the time receiver 702 module sends a time sensitive event (e.g., an edge signal) and records time information (e.g., a time stamp) associated with the time sensitive event. The output of the SR latch 706 is configured to interrupt both the time transmitter 704, and drive an input capture block of the time receiver 702.

Once the time transmitter 704 receives the interrupt, it will output an interrupt pulse on a GPIO (TS_INT) (another edge signal) and store an associated time information associated with the interrupt pulse. TS_INT is connected to the reset of the SR latch 706, and it will clear the trigger flag. Once the time receiver 702 recognizes the falling edge on its input capture, it can request the transmitter's time stamp over the main link. Notably, the main link can operate asynchronously to transmit the time information at a later point, completely asynchronous to the time sensitive information. In one such embodiment, the main link is an out-of-band (i.e., an interface separate from the GPIOs), asynchronous, communication channel configured to relay time stamp information.

Once the time receiver 702 has the local time stamp and the remote time stamp, as well as the pulse width between the two time stamps, the time receiver can determine the number of clocks which have elapsed, to determine a clock rate mismatch.

In one embodiment, edge signals are generated within firmware. As used herein, the term "firmware" relates generally and without limitation to very low-level software drivers configured to directly control the actual physical operation or mechanisms of the device. Generally, firmware is distinguished from higher-level software applications which leverage various degrees of abstraction and re-direction for operation. It is generally understood that the firmware provides only the most elementary and/or basic functions of device operation. Common examples of firmware instructions include e.g., writing a register, reading a register, asserting an output, reading an input, erasing a memory component, etc.

In various alternate embodiments, edge signals may be generated within progressively higher layers of software, or by dedicated hardware elements. However, it should be appreciated that higher layers of software will generally detract from precision, as each layer of software abstraction adds significantly more flexibility in the resulting compiled instruction scheduling. Similarly, while dedicated hardware can be used to generate edges with very high precision, hardware solutions are fixed in function and generally cannot be re-programmed or changed once the device is fabricated. Typical examples of hardware solutions include for example: application specific integrated circuits (ASICs), field programmable gate arrays (FPGAs), programmable logic devices (PLDs), and even dedicated discrete logic gates.

In one embodiment, edge signals are generated according to an atomic operation. Within the related arts, the term "atomic refers to a software operation or function that cannot be separated into component parts. Atomic operations are executed without compiler optimization. For example, an atomic operation to generate an edge transition ensures that the edge occurs at the moment of execution (i.e., the edge transition is not generated at a point selected by the compiler within a set of operations).

It will be recognized that while certain embodiments of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the embodiments disclosed and claimed herein.

While the above detailed description has shown, described, and pointed out novel features applicable to various embodiments, it will be understood that various omissions, substitutions, and changes in the form and details of the device or process illustrated may be made by those skilled in the art without departing from the principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A method for interrupt driven time synchronization within a device, the method comprising:
    generating a common event between a first and a second processor;
    observing a first number of clock cycles of the first processor during the common event;
    observing a second number of clock cycles of the second processor during the common event;
    determining a rate mismatch based on the first and second numbers of clock cycles;
    adjusting a rate based on the rate mismatch and a plurality of previously gathered rate mismatches, the adjusting of the rate comprising assigning a weight to the rate mismatch based on a size of the rate mismatch; and
    correcting one or more media samples for playback on the first processor based on the adjusted rate and the assigned weight;
    where the one or more media samples are provided by the second processor.

2. The method of claim 1, where the common event comprises a pulse width generated by the first processor setting a latch, and the second processor resetting the latch responsive to the first processor setting the latch.

3. The method of claim 2, further comprising receiving one or more time stamps via a main link.

4. The method of claim 3, further comprising associating the received one or more time stamps with an edge of the pulse width.

5. A wireless media device configured to receive media via a wireless network, the wireless media device comprising:
    a first and a second processor;
    a first clock associated with the first processor and a second clock associated with the second processor; and
    a non-transitory computer readable medium comprising one or more instructions which is configured to cause the first processor to, when executed:
    request a time synchronization event;
    observe a first number of first clock cycles of the first clock during a common event;
    receive a second number of second clock cycles of the second clock during the common event;
    determine a rate mismatch based on the first number of first clock cycles and a second number of second clock cycles; and
    correct a rate of playback of one or more media samples based on the determined rate mismatch and a rate scalar parameter, where the rate scalar parameter is derived from the determined rate mismatch and is configured to be periodically adjusted based on a reference rate during said playback of the one or more media samples.

6. The wireless media device of claim 5, where the first and second processor comprise an application processor and a wireless modem.

7. The wireless media device of claim 6, where the one or more instructions are further configured to cause the first processor to, when executed:
    set a latch;
    where the second processor is configured to responsively reset the latch; and
    measure a pulse width generated by the latch.

8. The wireless media device of claim 6, where the media comprises one or more audio data streamed via the wireless network.

9. The wireless media device of claim 6, where the wireless modem is time synchronized to the wireless network.

10. The wireless media device of claim 9, where the one or more instructions are further configured to cause the first processor to, when executed:
    receive a time stamp via an out-of-band link with the second processor, the time stamp associated with the common event.

11. The wireless media device of claim 5, where the one or more media samples comprise streaming audio samples.

12. The wireless media device of claim 5, where the one or more instructions are further configured to, when executed, select the second clock to oscillate at a frequency that is substantially similar to a radio frequency of the wireless network.

13. The wireless media device of claim 12, where the one or more instructions are further configured to, when executed, select the first clock according to one or more processor capabilities.

14. The wireless media device of claim 5, where the one or more instructions are further configured to, when executed, receive the second number of second clock cycles via an out-of-band link with the second processor.

15. The wireless media device of claim 5, where the one or more instructions are further configured to, when executed, determine the rate mismatch based on historic measurements.

16. A method for precisely synchronizing media processing within a network, the method comprising:
    tracking a plurality of timelines with respect to a local timeline;
    using a historical analysis of observed events for the plurality of timelines, estimating a relationship between the plurality of timelines and the local timeline;
    adjusting a rate scalar parameter based on the historical analysis of the observed events; and
    playing media in accordance with the adjusted rate scalar parameter.

17. The method of claim 16, where the tracking of the plurality of timelines comprises:
    tracking a network time, the network time referring to a value generated from a counter that is common to a plurality of devices of a network; and
    tracking a software sample time, the software sample time corresponding to a sample index of the media being played.

18. The method of claim 17, wherein the adjusting of the rate scalar parameter further comprises periodically updating the rate scalar parameter in accordance with receiving additional observed events for the plurality of timelines.

19. The method of claim 18, where the using of the historical analysis comprises comparing an observed timeline that is based on the observed events with an ideal timeline, the ideal timeline comprising a determined mathematical relationship between the observed events and a determined anchor point.

20. The method of claim 19, wherein the determined mathematical relationship between the observed events and the determined anchor point comprises using a linear analysis for each of the observed events and the determined anchor point.

* * * * *

UNITED STATES PATENT AND TRADEMARK OFFICE
CERTIFICATE OF CORRECTION

PATENT NO.         : 10,085,224 B2
APPLICATION NO.    : 14/548032
DATED              : September 25, 2018
INVENTOR(S)        : Richard Powell et al.

Page 1 of 1

It is certified that error appears in the above-identified patent and that said Letters Patent is hereby corrected as shown below:

Current reads ((71) Applicant):
"Apple, Inc., Cupertino, CA (US)"

Should read:
--Apple Inc., Cupertino, CA (US)--

Signed and Sealed this
Eleventh Day of December, 2018

Andrei Iancu
*Director of the United States Patent and Trademark Office*